(12) United States Patent
Kirwin

(10) Patent No.: US 7,856,374 B2
(45) Date of Patent: Dec. 21, 2010

(54) TRAINING RETAIL STAFF MEMBERS BASED ON STORYLINES

(75) Inventor: Paul Kirwin, Park City, UT (US)

(73) Assignee: 3Point5, Salt Lake City, UT (US)

( * ) Notice: Subject to any disclaimer, the term of this patent is extended or adjusted under 35 U.S.C. 154(b) by 1116 days.

(21) Appl. No.: 11/038,551

(22) Filed: Jan. 19, 2005

(65) Prior Publication Data

US 2005/0165645 A1 Jul. 28, 2005

Related U.S. Application Data

(60) Provisional application No. 60/538,881, filed on Jan. 23, 2004.

(51) Int. Cl.
*G06Q 30/00* (2006.01)
*G04B 47/00* (2006.01)
*G09B 3/00* (2006.01)

(52) U.S. Cl. ......................... 705/14.13; 368/10; 368/63; 368/107; 368/110; 368/119; 434/322; 235/377; 273/246; 375/358; 713/502; 713/503

(58) Field of Classification Search ................. 434/169, 434/322, 335, 354; 706/14; 368/10, 119, 368/63, 107, 110, 223; 235/377; 375/358; 377/13; 713/503, 502; 273/246; 348/715; 370/208; 705/14
See application file for complete search history.

(56) References Cited

U.S. PATENT DOCUMENTS

| | | | | |
|---|---|---|---|---|
| 4,011,434 A | * | 3/1977 | Hockler | 235/377 |
| 4,195,220 A | * | 3/1980 | Bristol et al. | 377/13 |
| 4,449,830 A | * | 5/1984 | Bulgier | 368/119 |
| 4,451,158 A | * | 5/1984 | Selwyn et al. | 368/63 |
| 4,634,128 A | * | 1/1987 | Fulton | 273/246 |
| 4,926,446 A | * | 5/1990 | Grover et al. | 375/358 |
| 5,178,545 A | * | 1/1993 | Thompson | 434/335 |
| 5,451,158 A | * | 9/1995 | Lin et al. | 439/79 |
| 5,796,681 A | * | 8/1998 | Aronzo | 368/10 |
| 5,933,625 A | * | 8/1999 | Sugiyama | 713/503 |
| 5,947,747 A | * | 9/1999 | Walker et al. | 434/354 |
| 6,024,572 A | * | 2/2000 | Weyer | 434/169 |
| 6,295,099 B1 | * | 9/2001 | Takahashi | 348/715 |
| 6,755,661 B2 | * | 6/2004 | Sugimoto | 434/322 |
| 6,986,664 B1 | * | 1/2006 | Thomas | 434/322 |
| 2002/0127528 A1 | * | 9/2002 | Potter | 434/322 |
| 2002/0163880 A1 | * | 11/2002 | Matsumoto | 370/208 |

(Continued)

*Primary Examiner*—John G Weiss
*Assistant Examiner*—Marilyn Macasiano
(74) *Attorney, Agent, or Firm*—Workman Nydegger

(57) ABSTRACT

Methods and apparatuses for manufacturer to present Web-based edu-games so as to train retail staff member about the manufacturer and its products and to access edu-game data and retail sales data from a database. A Website can be created to provide a point of interaction between the manufacturer, retailer, and retail staff member. By accessing this Website, the retail staff member is presented with the web-based edu-games and learns about the manufacturer and its products. The retail staff member can be presented with incentives by the manufacturer for completing the web-based training off time, which may prevent the retailer from paying for the costs of training the retail staff member. Alternately, retailers can also do training in-house (e.g., if required by statute). Manufacturers and retailers compare education levels to sales data to determine the effects of the training.

27 Claims, 7 Drawing Sheets

U.S. PATENT DOCUMENTS

| | | | |
|---|---|---|---|
| 2002/0194146 A1* | 12/2002 | Sirhall | 706/14 |
| 2004/0008589 A1* | 1/2004 | McMillan et al. | 368/223 |
| 2004/0044924 A1* | 3/2004 | Marik | 713/502 |
| 2007/0183269 A1* | 8/2007 | Baba | 368/110 |

* cited by examiner

| Retail Staff Member | Retailer | Manufacturer | Edu-game Scores | Retail Staff Sales |
|---|---|---|---|---|
| RS1 | R1 | M1 | M1 Scores | $2,000 |
|  |  | M2 | M2 Scores | $2,000 |
| RS2 | R2 | M3 | M3 Scores | $3,000 |
|  |  | M4 | M4 Scores | $1,000 |
| RS3 | R3 | M3 | M3 Scores | $30 |

Fig. 7

Receive Login From Entity 700 → Identify Entity 710 → Receive Data Access Request 720 → Access And Receive Data Elements 730 ↔ 740

Compare Associations Of Data To Identity Of Entity 750
- No Match → Refuse Data Access Request 760
- Match → Provide Data Elements 770

TRAINING RETAIL STAFF MEMBERS BASED ON STORYLINES

CROSS-REFERENCE TO RELATED APPLICATIONS

This application claims the benefit of U.S. Provisional Application No. 60/538,881 filed Jan. 23, 2004 entitled "Method For Brand Training Sales Representatives", the contents of which are hereby incorporated herein by reference.

BACKGROUND OF THE INVENTION

1. The Field of the Invention

This application relates generally to training employees. More specifically, this application relates to methods and apparatuses for training a retail staff member about a manufacturer and its products and retailers training their retail staffs to sell more efficiently.

2. The Relevant Technology

Educating retail staff members about a manufacturer and its products has become of increased importance in markets where the customer's purchasing decision is made at the point of sale. Recent studies suggest that up to 80% of purchasing decisions are made at the point of sale. Thus in these instances, a retail staff member who is on the sales floor will often have the greatest effect on the customer's purchasing decision.

Manufacturer's current advertising expenditures often do not take into account the effect that retail staff members have on the purchasing decisions of consumers. Many manufacturers tend to spend large amounts of money on general brand advertising, which is directed towards the consumer long before the sale. Such advertising may include radio and television commercials as well as advertising in print media. Such advertising by manufacturers does not fully recognize that in many markets a consumer would typically make the decision of what he or she will buy at the point of sale. This is particularly true for products such as sporting goods, for which customers typically rely on the recommendations of experienced (or seemingly experienced) retail staff member comments. For these types of products in particular, widespread marketing and advertising campaigns may have little direct effect on actual sales.

Further, there is often no advantage to the retailer for the retail staff member to favor one product over the other. As a result, the retailer has little motivation to train the retail staff member in depth as to any particular product unless one manufacturer provides a far greater profit margin than the others. In fact, retailers often desire to limit training as they must often pay their employees to attend. Rather, the retailer's needs are met when a retail staff member has enough general knowledge to make the customer believe that they have been helped.

Additionally, when manufacturers have trained retail staff members, it is often difficult for one manufacturer to determine if its training expenses have been well spent in industries where there is a high turnover rate of retail staff members. A substantial amount of money may be spent on training retail staff members who no longer sell the manufacturer's products after a very short amount of time with a particular retailer. Thus, it has been extremely difficult for manufacturers to determine if their training is having any benefits which justify the cost of frequent trips to retail locations to train the retail staff members.

If the retail staff member believes that a particular brand or product is superior, is of better quality, or is a better value, the retail staff member is far more likely to recommend that brand or product above its competitors. Retail staff members might mention that a particular manufacturer's product is liked and used by them, mention the product as an alternative, not mention the product, or mention the product in a negative way. However, many retailers and manufacturers fail to appreciate how vital these retail staff members can be to their own success. Thus, current advertising and training has not fully appreciated that it is in the manufacturer's (or wholesaler's) interest to have the retail staff member emotionally tied to the manufacturer's products.

Manufacturers have attempted to build loyalty in retail staff members by offering product discounts. Typically, discounts are extended to all employees of a retailer. As a result, a manufacturer may be offering discounts on one type of product (e.g. skies) to a retail staff member who sells products in a different area of the business (e.g. rock climbing). Furthermore, the discounts are usually not linked to sales volume, experience, or as an incentive for training of a retail staff member. As such, the discounts provide limited, if any, real incentive for a retail staff member to learn about the manufacturer. In addition, the discounts are not tailored to particular employees for greatest cost effectiveness to the manufacturer.

Thus, what would be advantageous is a more efficient and effective method of training retail staff members about a manufacturer and its product, which has a greater advertising impact on customers at the point of sale, can better influence the consumer's purchasing decision, and better encourage a retail staff member to learn about and become an advocate for the manufacturer and its products.

BRIEF SUMMARY OF THE INVENTION

The foregoing problems with the prior state of the art are overcome by the principles of the present invention, which are directed towards training retail staff members. In some embodiments, retail staff members are tested using (potentially Web-based) edu-games. A first edu-game is presented to a first recipient at a first location. The first edu-game comprises initiating a cumulative timer that indicates a cumulative time the recipient has been taking the edu-game. A first question and a plurality of corresponding possible first answers to the first question are displayed. A first countdown timer that expires after a first specified period of time is initiated. The first countdown timer indicates how long the first question is to be displayed. The time remaining on the first countdown timer is displayed. A first selection of one of the possible first answers is received. A first amount of time is added to the cumulative timer based on the received first selection. The cumulative time along with an indication of the received first selection is displayed subsequent to receiving the first selection.

The first edu-game further comprises displaying a second question and corresponding possible second answers to the second question. A second countdown timer that expires after a second specified period of time is initiated. The second countdown timer indicates how long the second question is to be displayed. The time remaining on the second countdown timer is displayed. A second selection of one of the possible second answers is received. A second amount of time is added to the cumulative time based on the received second selection. The cumulative time along with an indication of the received second selection is displayed subsequent to receiving the second selection.

In other embodiments, entities access retail sales personnel data elements stored in a database. A computer system receives login credentials for an entity. The entity is identified as authorized to access a retail sales personnel data element. Authorized entities can include one or more retail staff members, one or more retailers, and one or more manufacturers. A data access request from the entity is received for access to retail staff member data. One or more retail staff member data elements are accessed. Each retail staff member data element stores retail staff member data for a corresponding retail staff member, each retail staff member being employed by one of the one or more retailers, and each of the one or more retailers selling products for at least one of the one or more manufacturers. The entity is provided with access to the appropriate portions of the one or more retail staff member data elements based on the identity of the entity.

In further embodiments, a retailer logs into a Web site, is approved by a manufacturer, and in response to the approval is sent an identifying code (e.g., a retailer code or "R-code"). The retailer distributes the code to retail sales members. To access edu-games and other content from the Web site, retail staff members submit the identifying code and other relevant data (e.g., real name, store location, user-id, etc.) to the Website. The Web site generates an electronic message (e.g., an electronic mail message) and sends the electronic message to the corresponding retailer (e.g., the manager or owner of the store where a retail sales member is employed). The retailer approves the retail staff member's access to enter the Web site. In response to the approval, a retail sales personnel data element corresponding to the approved retail staff member is added to the database.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 6 depicts a chart illustrating an example arrangement of retail staff member data structures in a database.

FIG. 7 depicts a flow diagram illustrating an example method for providing a requesting entity with appropriate access to retail staff member data.

DETAILED DESCRIPTION OF THE PREFERRED EMBODIMENTS

Figure 1:
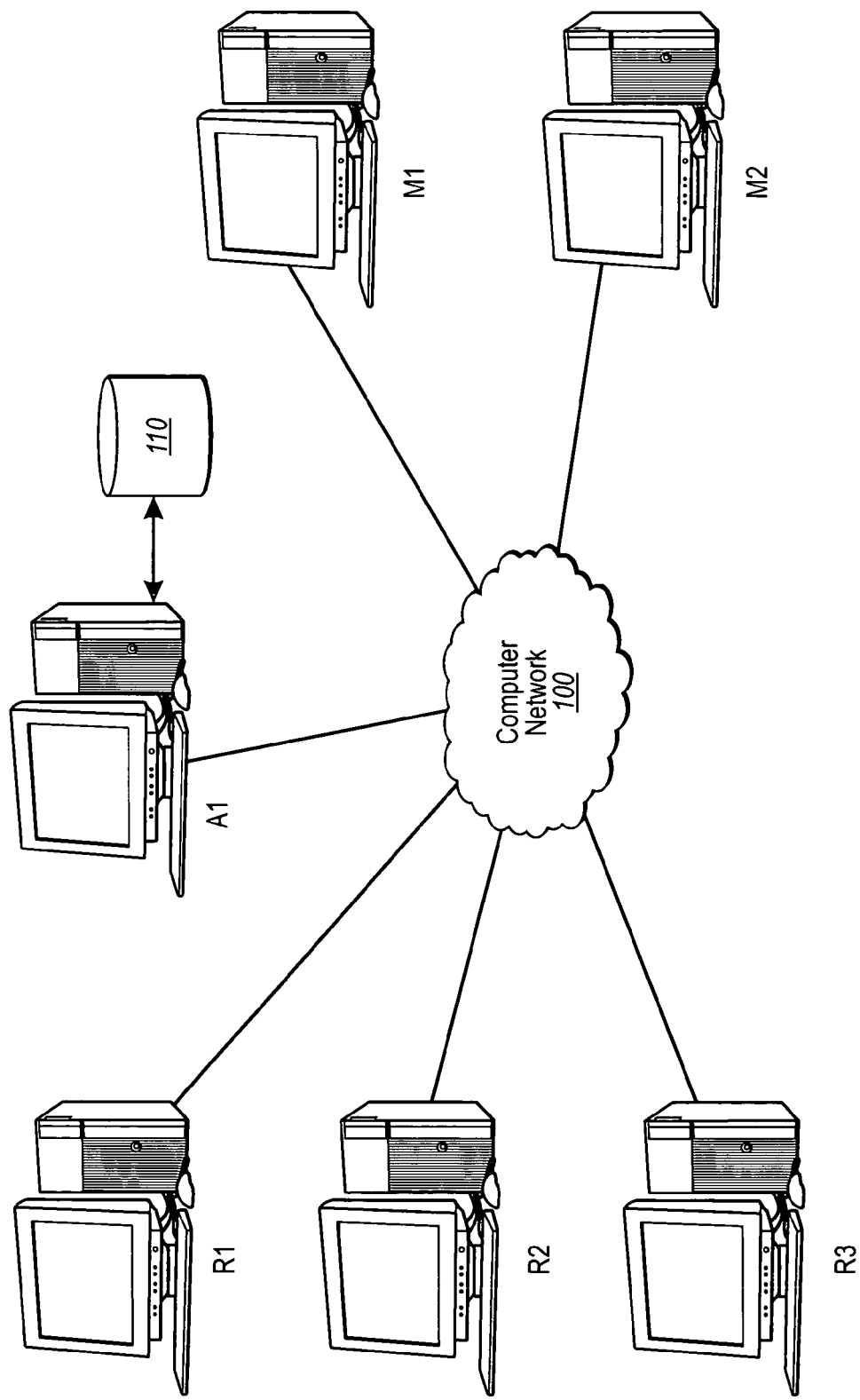
FIG. 1 illustrates an example of a system for practicing the present invention.

The principles of the present invention provide for training retail staff members. In some embodiments, retail staff members are tested using (potentially Web-based) edu-games. A first edu-game is presented to a first recipient at a first location. The first edu-game comprises initiating a cumulative timer that indicates a cumulative time the recipient has been taking the edu-game. A first question and a plurality of corresponding possible first answers to the first question are displayed. A first countdown timer that expires after a first specified period of time is initiated. The first countdown timer indicates how long the first question is to be displayed. The time remaining on the first countdown timer is displayed. A first selection of one of the possible first answers is received. A first amount of time is added to the cumulative timer based on the received first selection. The cumulative time along with an indication of the received first selection is displayed subsequent to receiving the first selection.

The first edu-game further comprises displaying a second question and corresponding possible second answers to the second question. A second countdown timer that expires after a second specified period of time is initiated. The second countdown timer indicates how long the second question is to be displayed. The time remaining on the second countdown timer is displayed. A second selection of one of the possible second answers is received. A second amount of time is added to the cumulative time based on the received second selection. The cumulative time along with an indication of the received second selection is displayed subsequent to receiving the second selection.

In other embodiments, entities access retail sales personnel data elements stored in a database. A computer system receives login credentials for an entity. The entity is identified as authorized to access a retail sales personnel data element. Authorized entities can include one or more retail staff members, one or more retailers, and one or more manufacturers. A data access request from the entity is received for access to retail staff member data. One or more retail staff member data elements are accessed. Each retail staff member data element stores retail staff member data for a corresponding retail staff member, each retail staff member being employed by one of the one or more retailers, and each of the one or more retailers selling products for at least one of the one or more manufacturers. The entity is provided with access to the appropriate portions of the one or more retail staff member data elements based on the identity of the entity.

In further embodiments, a retailer logs into a Website, is approved by a manufacturer, and in response to the approval is sent an identifying code (e.g., a retailer code or "R-code"). The retailer distributes the code to retail sales members. To access edu-games and other content from the Website, retail staff members submit the identifying code and other relevant data (e.g., real name, store location, user-id, etc.) to the Website. The Website generates an electronic message (e.g., an electronic mail message) and sends the electronic message to the corresponding retailer (e.g., the manager or owner of the store where a retail sales member is employed). The retailer approves the retail staff member's access to enter the Website. In response to the approval, a retail sales personnel data element corresponding to the approved retail staff member is added to the database.

The principles of the present invention are described with reference to the attached drawings to illustrate the structure and operation of example embodiments used to implement the present invention. Using the diagrams and description in this manner to present the invention should not be construed as limiting its scope. Additional features and advantages of the invention will in part be obvious from the description, including the claims, or may be learned by the practice of the invention.

As referred to herein, the term "manufacturer" refers to a product manufacturer or company, particular brand, wholesaler, or the like. The term "retailer" refers to a store owner, retail outlet owner/manager or the like selling the manufacturer's product. The term "retail staff member" refers to salespersons, staff, sales representatives, contractors of the retailer, employees of the retailer, or anyone who may be involved in selling the manufacturer's product at the point of sale.

According to one aspect of the present invention, retail staff members can be trained using methods and apparatuses for presenting (potentially Web-based) brand short stories (or "storylines") and (potentially Web-based) edu-games that quiz retail staff members on the content of the storylines. In some embodiments, retail staff members can access three different storylines for a brand, one storyline directed to the brand (e.g., history, etc), another storyline directed to the brand's technology, and yet another storyline directed to the brand's products. Storylines can include multi-media content (e.g., audio, video, etc), which surround important sales facts with humor, history, and passion.

An edu-game is a combination of multimedia content (e.g., audio, video, games, etc.) and questions that test a retail staff member's knowledge of a storyline. Each storyline can have a corresponding edu-game. Thus, for example in embodiments having a brand, technology, and product storyline, there can also be corresponding edu-games that test a retail staff member's knowledge of the brand, technology, and product storylines.

A Website can be created to provide a point of interaction between a manufacturer, a retailer, and a retail staff member. By accessing this Website, the retail staff member is presented with storylines to learn about a manufacturer, its technology, and its products and with edu-games that teach the retail staff member's knowledge of the storylines. The retail staff member can be presented with incentives by the manufacturers for completing the Web-based training and edu-games on their off time, which relieves the retailer from paying for the costs of training the retail staff member. Alternately, if retailers are required to pay employees for training (e.g., as dictated by statute) the administrative entity that manages the Website can be included in the retailers in-house training. Retailers are also provided appropriate access to and can view edu-game result data for retail staff members. Generally, manufacturers and retailers can compare education levels to sales data (in the case of retailers on a per retail staff member basis) to determine the effects of the training and more closely tailor the training to their benefit and the benefit of their customers. Brands can also compare edu-game results and sales data across different retailers. Retailers can also compare edu-game results and sales data across different retail locations.

The present invention may take the form of program code that is transmitted over some transmission medium, such as over electrical wiring or through fiber optics, for example. Although the use of a website provides many advantages discussed herein, one will appreciate that the present invention can also be accomplished by loading training or other software on a computer. Training may be accomplished on a computer at the retailer's place of business or at the retail staff member's residence, for example. Thus, the present invention may also take the form, at least partially, of program code (i.e., computer executable logic) recorded in tangible media, such as floppy diskettes, CD-ROMs, hard drives, random access or read only-memory, or any other machine-readable storage medium. Thus, when web page presentations are referred to herein, it should be appreciated that on-site software may be used to navigate between screen presentations represented in a program. When the method of the present invention is represented as a computer executable program that is run on a computer, network of computers, or other data processing system, the computer or system becomes an apparatus for practicing the present invention.

Referring to FIG. 1, a series of computers Retailers 1, 2, and 3 (or alternately R1, R2, R3), computers Manufacturers 1 and 2 (or alternately M1, M2) and computer Administration 1 (or alternately A1) are connected to a computer network 100, such as, for example, the Internet). A1 can be used to provide data stored on a database 110 to and can interact with the different computers R1, R2, R3, M1, and M2 at their various locations. As shown, there can be manufacturer computers M1 and M2 and retailer computers R1, R2, and R3 in communication with the administration computer A1 through the computer network 100. In such a manner both the manufacturers and the retailers can have access to a Website hosted by the Administration computer A1. A1 controls access to database 110 and the format in which the Website is presented.

Database 110 can also store edu-game results for retail staff members. For example, the results of Web-based edu-games taken at any of retail computers R1, R2, and R3 can be stored at database 110. Database 110 may also store retail sales data, contact information and profiles of each entity (manufacturer, retailer, or retail staff member) as well as other retail personnel data. The database 110 can be part of the administrative server A1 computer system depending on the application and amount of data stored. Appropriate portions of the database 110 may be accessed in a secured fashion by a particular manufacturer (e.g., from M1 or M2) and by a particular retailer (e.g., from R1, R2, or R3) as discussed in further detail below.

According to the embodiment shown in FIG. 1, the retail staff members would access the Website from the retailer computers R1, R2, and R3. However, where the computer communication network 100 is the Internet, the retail staff members could access the Website from any computer at any location with the appropriate interface to the Internet. It should be appreciated that each computer R1, R2, R3, M1, and M2 may be located across a local area network, or other communication hub, and access the Website via an appropriate connection to the computer network 100 (e.g. the Internet).

Figure 2:
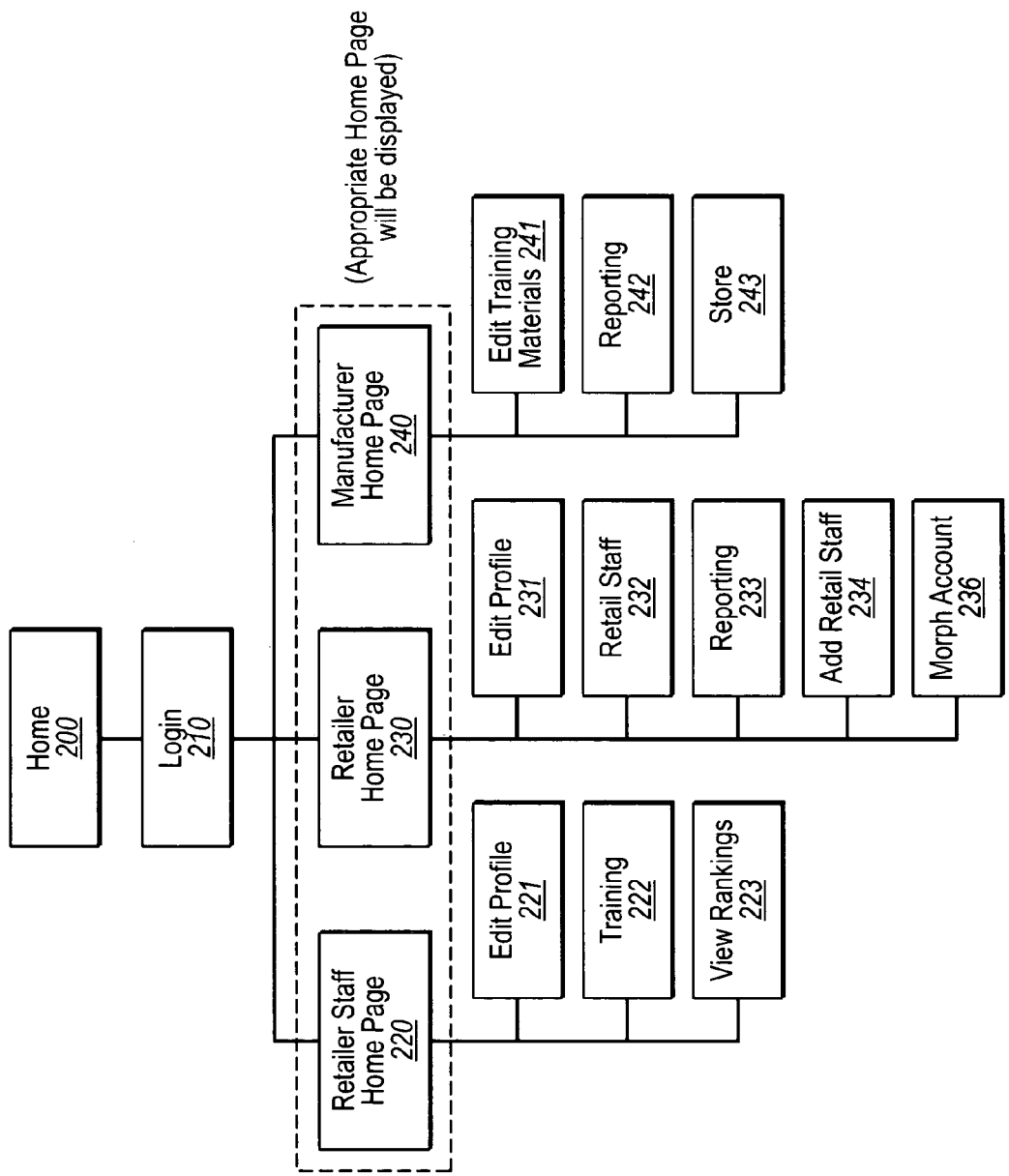
FIG. 2 depicts a flow diagram illustrating an example method for laying out and organizing a training Website.

Referring to FIG. 2, FIG. 2 depicts a flow diagram illustrating an example method for laying out and organizing a training Website. As depicted, using a computer with a connection to the Internet, an entity navigates their Web browser to the training website homepage (200). Upon viewing the training Website homepage, the entity is presented with data entry fields (210) for logging into the Website as a retail staff member, a retailer, or a manufacturer. The training Website homepage may be embodied in various formats and layouts, and can incorporate additional options, present additional information, hyperlinks to other Web pages, and can include music, imagery, marketing text, and a description of the Website.

For example, a training Website home page can include graphics tailored to the particular industry. In addition, music can be incorporated into the homepage which may be of particular benefit in industries such as the outdoor product industry where particular types of music are an integral part of the lifestyle of the retail staff members and the industry in general. The training Website homepage can include administrative links such as links to other Web pages for signing up for training services, presenting information related to the administrator offering the training services, and contact information or other information about obtaining training services. The training Website homepage can further include additional information such as a welcome message and spotlight a retailer, retail location, or retail staff member that has performed particularly well in the training, for example. In the case that a login entered into a login field is invalid or a entity login and password need to be set up for the entity, the entity can be directed to pages indicating that the login or password were not valid and that a one must be set up as is known to one of ordinary skill in the art.

After the entity views the training homepage and logs in, the entity is presented with a retail staff member homepage (220), a retailer homepage (230), or a manufacturer homepage (240) depending on the entity's status. Thus, access to the Website would depend on the status of the entity who logged into the site, and their status would limit their ability to access information available to other entities with different status. It should be appreciated that an administrator homepage option can also be included for administrative purposes and maintenance of the Website.

In the event that the entity logs in as a retail staff member, the entity can be given retail staff member status. Accordingly, the entity can be directed to the retail staff member homepage (220). The retail staff member homepage (220) can include links to additional Web pages relevant to retail staff members. For example, the retail staff member homepage can include a link (221) to a Web page for entering and editing a retail staff member profile for the specific retail staff member. The retail staff member homepage can also include a link (222) to a training homepage, which is described in further detail below. The retail staff member homepage can also include a link (223) to a homepage where rankings and performance charts are presented to the retail staff member, for example, per retail location and/or across different retail locations under common ownership. The retail staff member home page (220) can enable the retail staff member to view edu-games completed, edu-games to be taken, and overall results achieved on the completed edu-games.

The retail staff member homepage (220) can be embodied in various formats and layouts, and can incorporate additional options, present additional information, and hyperlinks to other Web pages. An example layout of a retail staff member homepage may also include graphics and music suitable for the particular industry. Music and graphics are particularly advantageous when incorporated into an outdoor equipment retail staff member homepage. As one who is familiar with the outdoor equipment industry can appreciate, music, style, and images of outdoor activity are of particular importance when training retail staff members that work in the outdoor equipment industry.

Retail staff members choose to work in a particular industry for many reasons. However, three of the most important reasons that retail staff members choose to work in the outdoor equipment industry are (1) lifestyle, (2) gear, and (3) money. Often retail staff members sacrifice money to some extent in order to become a greater part of the outdoor lifestyle, and to learn about and obtain the most cutting edge outdoor gear. In this case, music, graphics, and the style of the retail staff member homepage play into the outdoor sports industry's image. Thus the music, graphics and layout may be of particular importance depending on the industry for which the training website has been designed for.

The retail staff member homepage can include a welcome message that gives an introduction to the Website and instructions tailored to the particular retail staff member. The retail staff member homepage can further include a retail staff member profile and retail staff member rankings, which may be defined in terms of store, department, or other classification to foster valuable competition between the retail staff member. The retail staff member homepage can also identify the specific retail sales member by name and retail location.

As discussed above, in many industries, such as the outdoor equipment industry, the gear is one driving factor why retail staff member choose a particular industry. Often a retail staff member will take pride in their knowledge of the products that they sell. Being known as an "expert" even at their own retail location may be of great importance to a particular retail staff member. In these instances ranking the retail staff member on their performance and providing the ranking to the retail staff member for beneficial competition between retail staff member may provide an additional incentive for retail staff member to complete the training and strive for a higher score and complete additional training.

The retail staff member homepage (220) can include a training link (222) to the storyline and edu-game portion of the Website for a particular manufacturer. The training link (222) can incorporate distinctive trademarks and graphics so as to improve association and retention of the manufacturer's distinctive marks and products to the retail staff member. Thus, a retail staff member can have access to storylines and edu-games, editing their entity profile and contact information, and communication to the retailer or manufacturer.

In the event that the entity logs in as a retailer, the entity can be given retailer status. Accordingly, the entity can be directed to a retailer homepage (230). The retailer homepage (230) can include links to several options that may be of use to a retailer. For example, the retailer homepage (230) can include a link (231) to a Web page for entering and editing a retailer profile for the specific retailer. The retailer homepage (230) can further include a link (232) to retail staff member information such that the retailer and edit, add, delete, and view retail sales member information. The retailer homepage (230) can also include a link (233) to report information, such as, for example, edu-game scores, incentives earned, sales data, and rankings.

The retailer home page (230) also includes a link (234) for adding retail staff members. Link 234 can be used to access a list of electronic messages (e.g., electronic mail messages) from retail sales members that desire to sign up for retail sales member access (i.e., to be able to access retailer staff homepage 220). When information in a retail staff member electronic message is sufficient, for example, when an electronic message includes accurate personal information, an electronic mail address, and a valid identifying code (e.g., a retailer code or "R-code"), a retailer can approve the retail staff member. In response to retail staff member approval, the retail staff member can be assigned a user name (potentially the submitted electronic mail address) and a password. User names can be subsequently changed by retail staff members.

An identifying code can be received from a corresponding manufacturer via virtually any communication mechanism prior to retail staff members signing up for access.

The retailer homepage can also include a link (236) for morphing account the retailer account into a retail sales member account. Morphing allows a retailer to assume the identity of a retail sales member without having to create a separate retail sales member account. Thus, the retailer (e.g., manager or owner) is able to access storylines, take edu-games, and earn product discounts in the same manner as retail sales members.

The retailer homepage (230) may be embodied in various formats and layouts, and can incorporate additional options, present additional information, and hyperlinks to other web pages. An example layout of a retailer homepage can include graphics and music suitable for the particular industry. The retailer home page can include a link for approving staff, a link for compiling and viewing edu-game score reports and rankings, a link for searching for retail staff members, and a link for adding retail staff members.

In the event that the entity logins in as a manufacturer, the entity can be given manufacturer status. Accordingly, the entity can be directed to a manufacturer homepage (240). Manufacturer homepage (240) can include links to several options of use to a manufacturer. For example, manufacturer homepage (240) can include a link (241) for editing training materials, such as, for example, brand storylines and edu-games. Manufacturer homepage (240) can also include a link (242) to Web pages for reporting, such as, for example, edu-game scores, incentives earned, sales data, and rankings. Such information can be reported per retailer. Manufacturer homepage (240) can also include a link (243) to a company store where the manufacturer can edit categories, products, orders and review electronic mail.

The manufacturer homepage (240) may be embodied in various formats and layouts, and can incorporate additional options, present additional information, and hyperlinks to other web pages. An example layout of a manufacturer homepage can include graphics and music suitable for the particular industry. The manufacturer home page can include links for sending identifying codes (R-codes) to retailers, generating reports, searching for retailers, and adding retailers.

The training program and Website can generate reports describing the results of the training sessions (which may be presented along with other data) and can be sent to the manufacturer, retailer, or retail staff member. Additionally, communications between a Website administrator, manufacturer, retailer, and retail staff member can occur via mail, telephone, the Internet, e-mail based communications or other means. A retailer would be able to change the retailer contact information, manage their staff information, view staff progress, and so draw comparisons between education and sales volume. Thus, the Website may provide a point of interaction and communication between the manufacturer, retailer, and retail staff members.

Access by each party to the Website and various home pages can be established in various methods. For example, the manufacturer may first contact, or be recruited by, the administrator of the training and testing Website. The administrator can then send the manufacturer login credentials, such as a distinct user name and password for accessing the manufacturer oriented portions of the Website. The manufacturer can then work with the administrator to set up the manufacturer's training and testing portions of the Website to be accessed by retailers and corresponding retail staff members.

The manufacturer can also enter data related to the retailers selling their products. Retailers can access the Website (e.g., at A1 in FIG. 1) and sign up for access. Upon a retailer's successful registration, the Website can send the retailer an identifying code (e.g., an R-code) for the manufacturer. The retailer can in turn pass this identifying code to its retail staff members and the retail staff members use the code to register. Upon successful registration, each retailer and retail staff can be sent credentials (e.g., user-id and password). Upon receiving appropriate user credentials (from the retailer), retail staff members can log into the Website and complete any retail staff member information needed to begin the training and testing sessions.

After the retail staff member completes each level of training their score can be recorded in a database. Retailers and manufactures with appropriate permissions can then access the retail staff member scores. It should be understood that a retail staff member can be associated with a retailer and with one or more particular manufacturers for which they sell products. Similarly, a retailer can be associated with one or more retail staff members (e.g., which they employ) and with one or more manufacturers for which their retail staff member's sell products. Also, each manufacture can be associated with one or more retailers and one or more retail staff members that sell the manufacturer's products.

Figure 3:
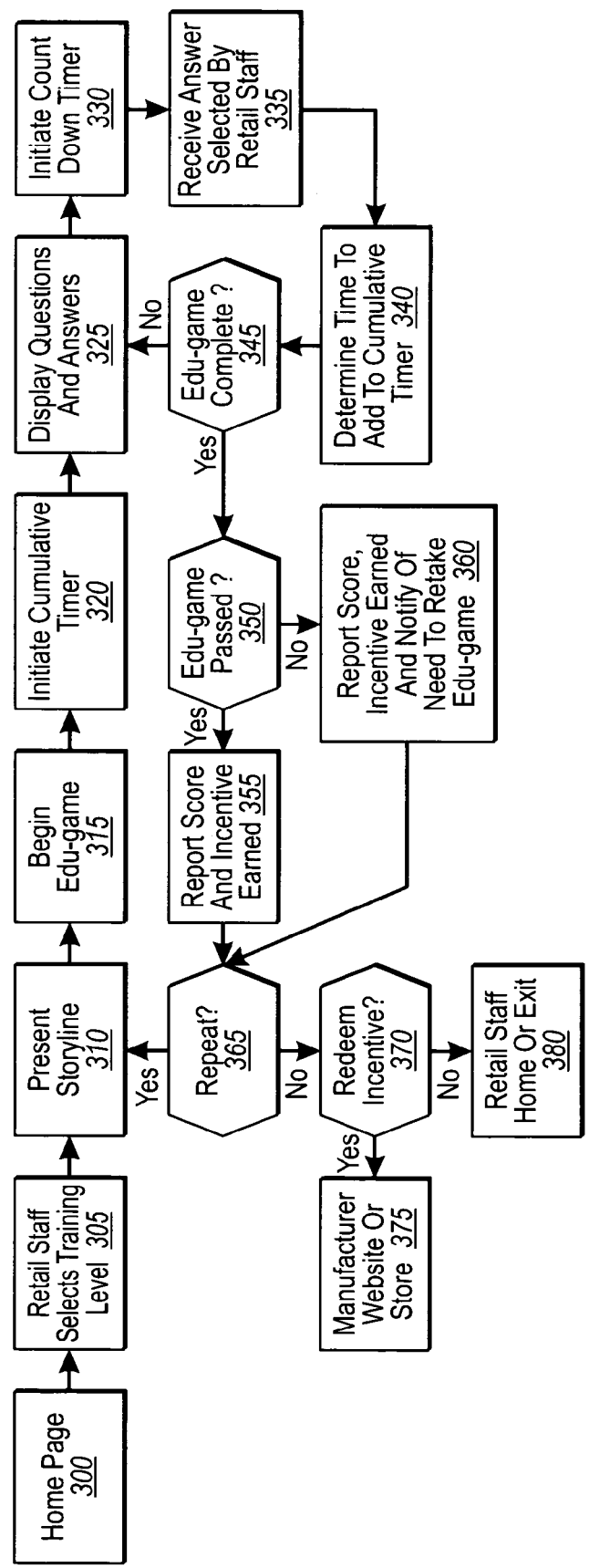
FIG. 3 depicts a flow diagram illustrating an example method for training and testing at a Website.

FIG. 3 depicts a flow diagram illustrating an example method for presenting a training and testing scenario at a training and testing Website. As depicted in FIG. 3, upon navigating to the retail staff member testing portion of the website, a retail staff member arrives at a training home page (300) (e.g. accessed by link (222) in FIG. 1). The retail staff member training home page (300) can include retail staff member information identifying the particular retail staff member and indicating the levels of training and edu-games completed by the retail staff member, as well as the retail staff member's performance on corresponding edu-games.

The retail staff member training and testing homepage may be embodied in various formats and layouts, and can incorporate additional options, present additional information, and hyperlinks to other web pages. The retail staff member training and testing homepage can include graphics and music suitable for the particular industry and personnel. Music and graphics are particularly advantageous when incorporated into an outdoor equipment retail staff member training and testing homepage as discussed above.

The retail staff member training and testing home page can include a retail staff member profile describing the retail staff member by name, location, ranking, and discount level earned, for example. The retail staff member training and testing home page can also include a direct link to a manufacturers Website or company store for the retail staff member to purchase goods using the discount earned from completed training and edu-games. The retail staff member training and testing home page can include a ranking of retail staff members and additional potential incentives that may encourage the retail staff member that has already completed the training modules to retake them in order to achieve a higher score and improve their ranking or receive the additional incentive.

The retail staff member training and testing homepage can further include graphical navigation links for completing each level of training. The level of training can be organized into distinct subject matter related to a particular manufacturer. According to a particularly advantageous aspect of an example embodiment of the present invention, the training sessions can be organized into different levels. A first level can be a brand's story, or a historical description of how the manufacturer developed their product. For example, in some cases, describing how the manufacturer rose from a fairly meager beginning where they experienced various failures and successes to arrive at the cutting edge of outdoor equipment pushing technological advances in the industry along the way.

This logically leads the retail staff member to a second level of the training modules, which can include storylines describing the technology behind the manufacturer's products. The technology storyline can be described in a way that is tailored to the retail staff member's level of expertise and presents the information in a way that is easily understood and remembered by the retail staff member so that it may be subsequently conveyed to the consumer at the point of sale.

After the technology behind the manufacturer's products have been conveyed to the retail staff member, the next level can build on this technological foundation by describing new products or prototypes of the manufacturer or the industry.

Thus, according to example embodiments of the present invention a logical progression of storylines can be presented to the retail staff member in a manner specifically tailored to the industry that conveys valuable information about the manufacturer and its products to the retail staff member, which is in turn presented to the consumer at the point of sale.

After the retail staff member has navigated to the retail staff member training and testing website (300), the retail staff member can select a training level (305). Depending on whether the training levels are to be completed in a specific predetermined order, the Website may send the retail staff member an error message where the retail staff member has attempted to take an unavailable level before completing a prior required level. After the retail staff member selects a proper level of training (305), the retail staff member is transferred to a storyline presentation web page (310). The storylines can be presented to the retail staff member in chapters. In this manner, the amount of information presented to the retail staff member may be reduced to segments and the content of the information can be presented with graphics and music to further increase retention of the information.

The Web page for presenting the various chapters of a storyline can include a graphical representation of each chapter with images relating to the contents of each chapter for further enforcing retention of the information and storyline contained in each chapter. The retail staff member can click on each image relating to a particular chapter and navigate through pages of the chapter of that particular storyline. The chapter presentation screen can include a portion of the chapter along with an image for reinforcing the storyline. The screen presentation can further include links to sequential screens making up each chapter of the storyline. The screen presentation can further include a graphical navigation representation indicating the chapter currently being viewed by the entity. The screen presentation can further include a link to the edu-game portion of the website. After navigating through the various screens, chapters, and pages of the storylines making up the testing level, the retail staff member clicks on the link to the edu-game portion of the Website.

Thus, in some embodiments, brand training includes the presentation of three storylines, brand, technology, and new products. Each storyline can include three chapters and each chapter can include three pages. After the completion of a storyline, a corresponding edu-game can be taken. Thus, it may also be that brand training includes taken three edu-games that correspond to the three brand storylines.

Upon navigating to the testing portion of the Website, the retail staff member can be presented with a testing instructions home page where a description of the rules and format of each edu-game is presented to the retail staff member. For example, the edu-game can include 6 questions and the retail staff member may be required to correctly answer 4 out of 6 questions to pass the edu-game. The retail staff member can also be ranked and earn incentives based on a total cumulative time that is determined after all the questions of each edu-game have been successfully completed. After initiating an edu-game by clicking the start button, the retail staff member navigates through a plurality of questions testing the retail staff member on the subject matter contained within the storylines of the relevant testing level.

Referring still to FIG. 3, once the edu-game has begun (315) a cumulative timer is initiated (320) and begins to count upward from zero. A question is displayed (325), and a question count down timer is initiated (330) beginning from a predetermined amount of time and incrementally counting downward to zero. The retail staff member selects an answer (335) from the possible answer set and an amount of time is added to the cumulative timer based on the answer selected by the retail staff member and the amount of time left on the question count down timer.

For example, according to an example embodiment of the present invention, when the question is answered correctly an amount of time equal to zero seconds can be added to the cumulative time. When a question is answered incorrectly the amount of time left on the count down timer can be added to the cumulative timer. When a question is not answered by the expiration of the count down timer an amount of time equal to the amount of time allowed can be added to the cumulative test timer. In this manner, there is an incentive for the retail staff member to complete each question correctly in as short of time as possible. According to other embodiments of the present invention additional time may be added to the cumulative test time where the retail staff member has selected a wrong answer, or has not selected an answer by the expiration of the count down timer.

In some embodiments, edu-games transition between presenting entertaining multi-media content (e.g., a computer game) and presenting questions that test a retail sales member's knowledge of a relevant storyline. Answers to the presented questions can affect the outcome of the entertaining multi-media content. For example, an incorrect answer may result in a penalty within a corresponding computer game.

Figure 4A:
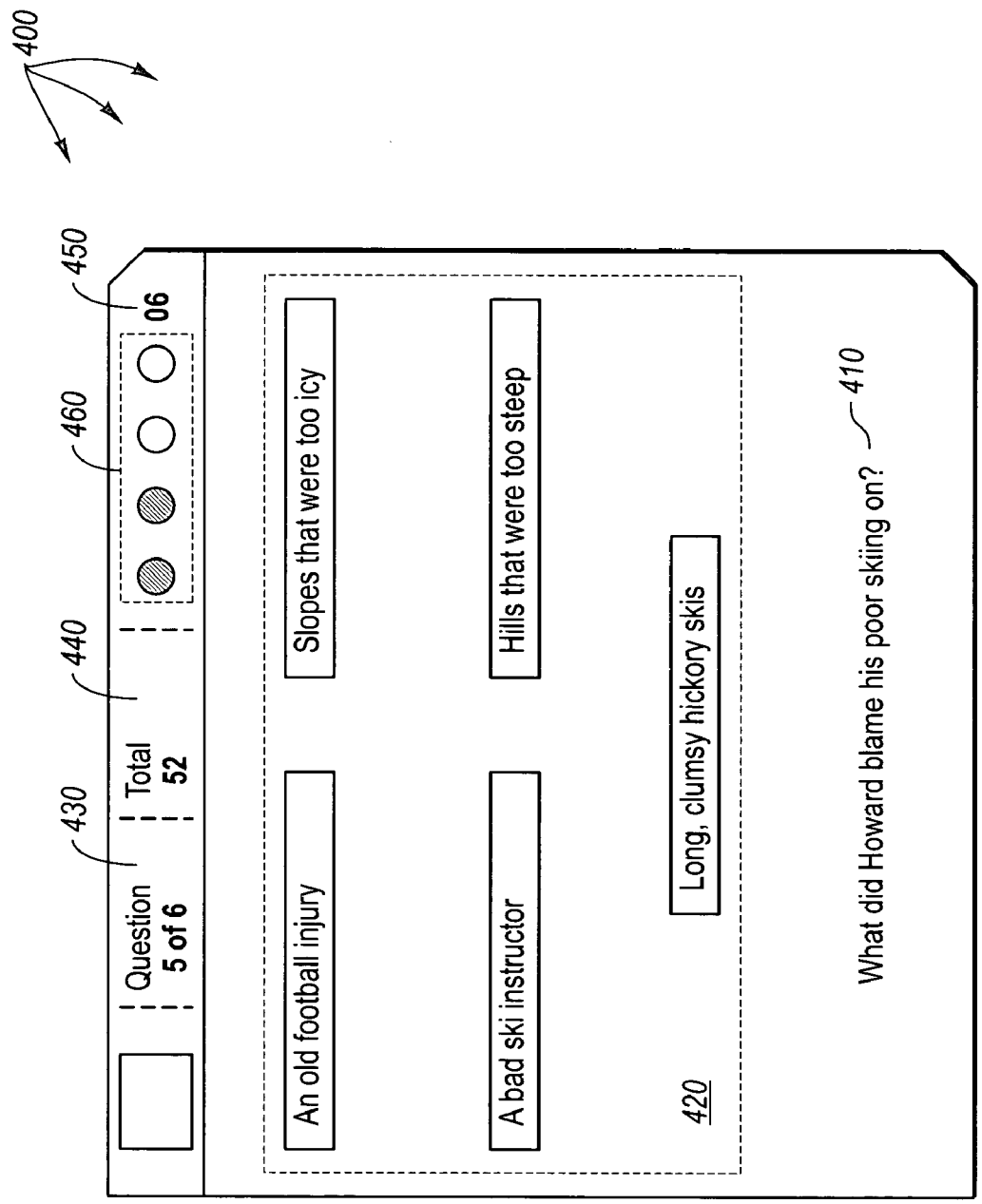
FIG. 4A illustrates a screen presentation depicting a question and corresponding potential answers to the question.

FIG. 4A illustrates a screen presentation 400 of an example edu-game question. Depicted in screen presentation 400 is question 410 and corresponding potential answers 420 to question 410. The screen presentation 400 can further include an indication 430 of the total number of questions and the current question being answered. The screen presentation can include a visual representation of the cumulative timer 440 and an indication of the question count down timer 450. The question count down timer can be represented both by a numerical representation 450 and a graphical representation 460.

Generally, questions can be placed below the potential answers, above the potential answers, or the layout of the question and answers may be varied from question to question, so as to change the format of the layout for each question. In some embodiments, edu-games are non-linear and questions and answers can be presented statically anywhere on a screen. In other embodiments, questions may move around on the screen.

Figure 4B:
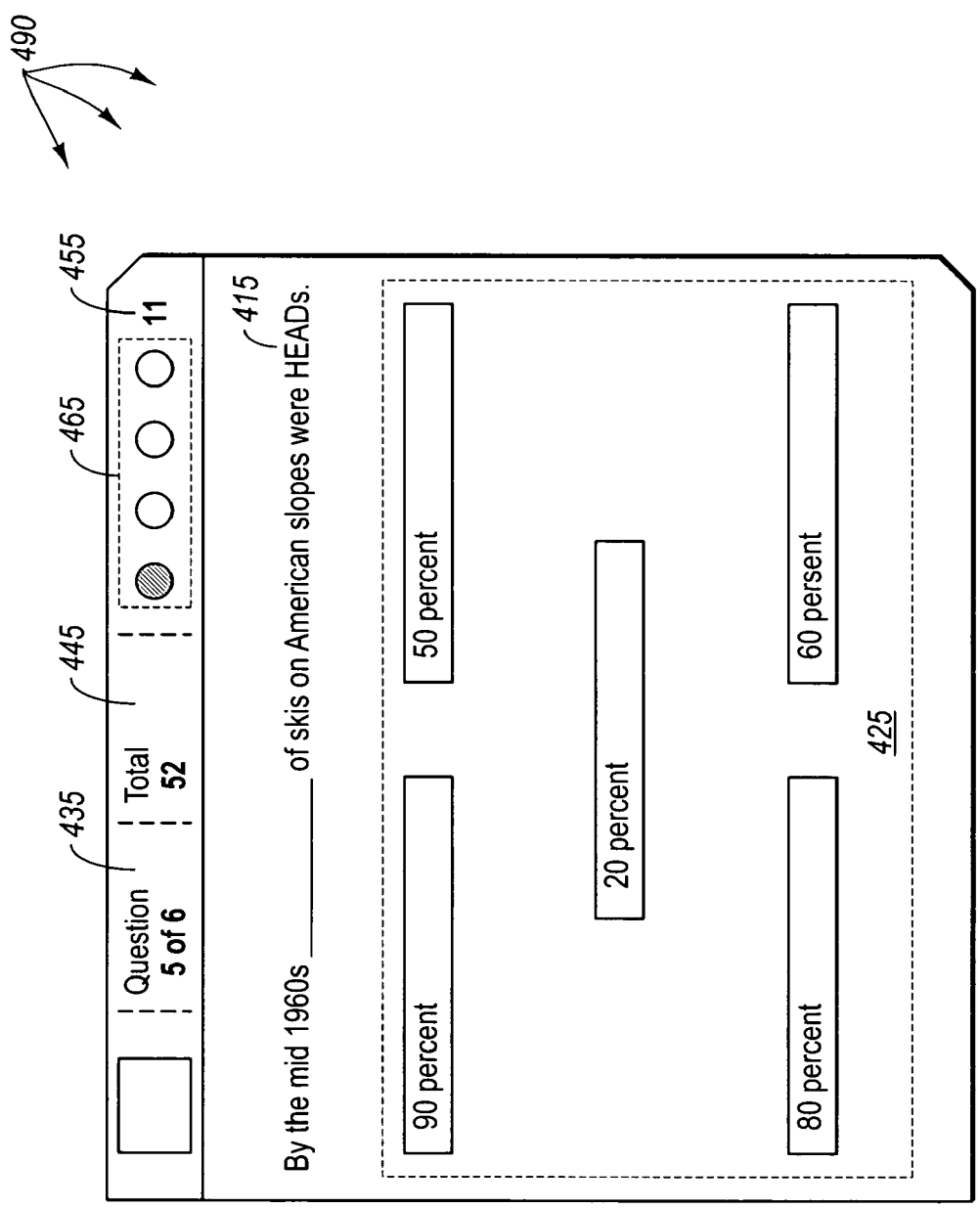
FIG. 4B illustrates another screen presentation depicting a question and corresponding potential answers to the question.

For example, FIG. 4B illustrates a screen presentation 490 depicting a question 415 and corresponding potential answers 425 to the question 415 according to another example embodiment of the present invention. Similar to that discussed above, the screen presentation can further include an indication 435 of the total number of questions and the current question being answered. The screen presentation can include a visual representation of the cumulative timer 445 and an indication of the question count down timer 455, which can be represented both by a numerical representation 455 and a graphical representation 465. Comparing FIG. 4B to FIG. 4A, the placement of the answers 420 and 425 can change on the screen presentation as well as the placement of the question 410 and 415. If the answers to the edu-game are not correct, additional information describing the correct answer may be provided to the representative after each question is answered or after the edu-game has been completed.

In addition to changing the static presentation of the question and answers, the question and answers can dynamically enter the screen in different manners. For example, the question can be presented in a dynamic manner by entering the screen from different locations, paths, and directions and in some embodiments may continue to move until an answer is received. Similarly, the answers can move across the screen from different angles and configurations before arriving at a static position on the screen presentation. Thus, a retail staff member would be less likely to be able to memorize the layout and presentation of the question and answers, and as a result less likely to memorize the location of a correct answer.

The possible wrong answers can be randomly selected from a set of possible wrong answers that is much larger than the number of wrong answers displayed. In this manner, the wrong answers presented with a question would change each time an edu-game is taken. Similarly, the potential questions can also be randomly selected from a set of possible questions that is larger then the number of questions displayed in an edu-game (e.g., more than six). In this manner the questions presented each time the edu-game is taken change and a retail staff member would more likely review the entire storyline again rather than trying to memorize the answers to the questions.

Referring again to FIG. 3, after the answer has been received (335) and time has been added to the cumulative timer (340), the Website determines whether all edu-game questions have been answered (345). In the case that not all questions have been answered the edu-game presents the next question and potential answers to the question (325). In the case that all questions of an edu-game have been presented and answered it is determined whether the edu-game has been passed (350). For example, in the instance described above where the edu-game requires that four out of six questions be answered correctly to pass the edu-game, the Website would determine whether four questions were answered correctly and present the results to the retail staff member.

In the event that the retail staff member passed the edu-game, the retail staff member is presented with their score and any incentive earned (355). The retail staff member's score can be represented by their cumulative time and an incentive can be represented by a discount, such as a percentage discount on goods, a fixed amount discount, special offers, free products, a recognition or award to be used at the manufacturer's Website, or by other means.

In the instance that the retail staff member failed the edu-game, the retail staff member is presented with their score, any incentive earned, and notified of the need to retake the edu-game (360). Next, the retail staff member is presented with the option of selecting an additional edu-game to take, or retake (365) as the case may be. In the instance that the retail staff member selects an edu-game to take, or retake, the retail staff member can be presented with the relevant storyline and subsequently the corresponding edu-game(310). If the edu-game is sufficiently interesting or high scores are posted, even those who passed an edu-game may wish to review the storylines again and retake the edu-game to raise their score and as a result raise their ranking.

Additionally, it is desirable to scale the award. For example, passing a first training level may provide the retail staff member with a 5% discount off the manufacturer's products. By reducing the cost of buying the manufacturer's products, the emotional investment of the retail staff member is further increased. As a retail staff member moves through multiple levels or modules, the retail staff member not only increases his knowledge regarding the manufacturer, he or she can also increase the amount of discount which is available to him or her. Thus, for example, a retail staff member passing three training modules may receive a 35% discount on the manufacturer's products. Discounts can be applied to the wholesale price of the products, making those products even more appealing.

Because the retail staff member is able to obtain such a large discount, it is more likely that they will buy that manufacturer's products. Once they have purchased the manufacturer's product, the retail staff member is even more emotionally invested in that product. Thus, when a customer comes and asks which manufacturer makes the best product or provides the best value, the retail staff member will more likely identify the manufacturer that he or she uses, and about which he or she knows a substantial amount of information.

Referring still to FIG. 3, in the event that the retail staff member decides not to take further edu-games the retail staff member can be presented with the option (370) of visiting the manufacturer's ecommerce Website or store (375) to redeem any incentive earned by the retail staff member. In the instance that the retail staff member decides not to redeem the incentive (370) the retail staff member can be redirected to the retail staff member home page, or exit out of the Website (380).

Thus, methods and apparatus for presenting a storyline and an edu-game to a retail staff member have been described. As the retail staff member masters an increasing amount of information regarding the manufacturer, the retail staff member is then able to tie aspects of the manufacturer's story to the retail staff member's story presented to a customer at the point of sale. For example, if a retail staff member learns that a particular customer is from a particular part of the country, he or she may indicate that the manufacturer started in a neighboring state. Likewise, if the customer is overly concerned about durability of the products, the retail staff member can identify studies or technologies used in the construction of the manufacturer's product demonstrating that the manufacturer's products are particularly robust.

The training can be beneficial in educating the retail staff member, and to provide information to support his or her emotional investment in the manufacturer's products. Edu-games further prioritize and reinforce this information. This is particularly true if the questions and answers further tie the storylines to the manufacturer. Other tests or games can be implemented. For example, a ski manufacturer may want a ski game, while a baseball glove manufacturer may want a video baseball game.

In addition to providing training to the retail staff member, the Website or associated computer programs can also be used for direct communications. For example, if a manufacturer had excess inventory of a particular ski parka, the manufacturer may choose to offer it at steep discounts to those who have passed a certain number of levels of training, as these people are typically the most emotionally invested in that manufacturer's products. Such retail staff members are not only the most likely to buy the product, but are the most likely to wear or use the product and to recommend the product to their customers.

According to another aspect of the present invention, the Website (e.g., through an appropriate management module) may provide a substantially easier method of communication between manufacturers, retailers, and retail sales members. The Website and associated computer system databases can also contain contact and other information such as the different entities names, e-mail addresses, positions, home mailing address, or which product lines a retailer carries or which products each representative sells. Having access to this information, the Website can then filter or sort the information for communication between parties. For example, the manufacturer may send an inquiry regarding a specific product only to retail staff members involved in selling that product, or may communicate only with retailers selling a certain amount or type of product.

The Website can provide sorting or filtering capabilities to the manufacturer or retailer, allowing a manufacturer or retailer to select a group of individuals to communicate with. The retailer or manufacturer can select a group of individuals and send one message to every individual in the group. For example, the manufacturer may simply filter the list of retail staff members to select all those who have completed a certain level of training or achieved a certain amount of sales and send an email to each representative with a special offer or incentive as a reward for their achievements. Such communication can be sent quickly and easily because the Website and associated computer equipment contains all of the necessary information for the communication, and provides the capability to perform the desired filtering and communication quickly and easily.

In some embodiments, stocking keeping unit ("SKU") specific filtering is implemented to generate reports for subsets of the manufacturer's products. SKU specific filtering is advantageous when a retailer sells less than all of a manufacturer's products. For example, if manufacturer offers 12 lines of skis but a ski retailer only sells 4 of the 12 lines of skis, the manufacturer may desire to filter results for the retailer such that corresponding reports only show sales data for the 4 lines of skis that are actually sold at the ski retailer.

With the consent of the retailer, communications can be had directly between the manufacturer and the retail staff member so as to provide direct feedback between the two. For example, a retail staff member may wish to ask if next year's product will include a certain color. Rather than working through his or her retailer, the retail staff member is able to go directly to the manufacturer. Likewise, the manufacturer can directly contact retail staff members who have gone through training modules and ask them why a particular product is not selling well or what other marketing could be done that would help sell the product better. Such an exchange creates a greater emotional investment both on the part of the manufacturer towards the retail staff members and the retail staff members towards that particular manufacturer, increasing the commonality of interest and the potential profitability of each.

Another benefit associated with a Web-based embodiment of the present invention is the ability to track the effectiveness of training. In accordance with one aspect of the present invention, the manufacturer is able to monitor which retail staff members from which retailers have undergone training. For example, if a retailer has poor sales and none of its retail staff members undergo training, the manufacturer is able to talk to the retailer to encourage training as to the product. If training still does not occur, the manufacturer is able to determine whether they should take action, such as shift their product to a different retailer. In contrast, if multiple retail staff members undergo training and the sales from those retail locations improve, then the manufacturer is content that the training is producing the desired effects.

Such a system can also be used to test various types of training in the field by providing one group of retail staff members one type of training information or storyline and another group of retail staff members a different type of information or story line. If the retail staff members receiving one type of story show significant improvements in sales that are not matched by the other, it becomes apparent that it is the training that is increasing sales, rather than simply the product.

Figure 5:
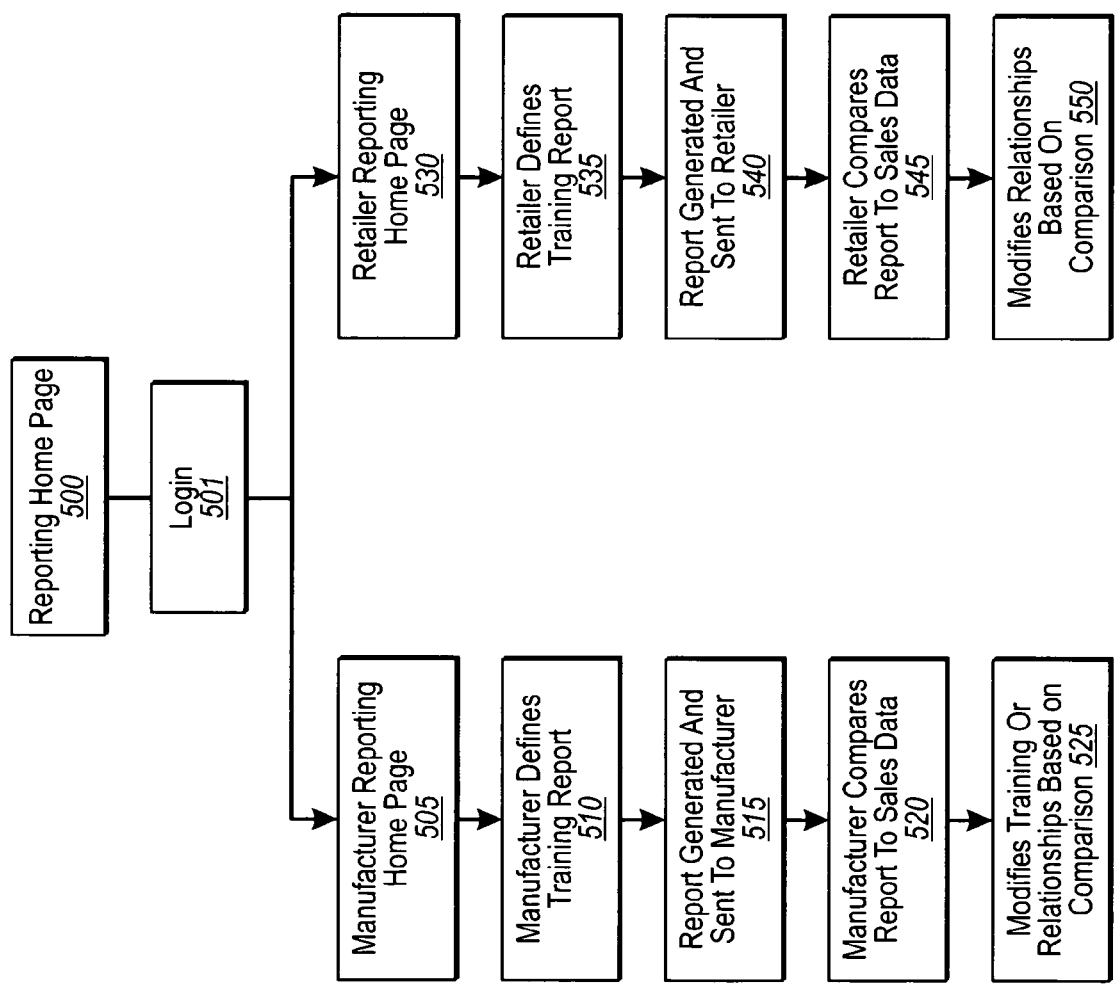
FIG. 5 depicts a flow diagram illustrating an example method for a reporting process for retail staff member data.

FIG. 5 depicts a flow diagram illustrating an example method for a reporting process for retail staff member data. As depicted in FIG. 5, an entity, such as a manufacturer or retailer, navigates to a report generation home page (500). The reporting home page (500) provides a log-in field (501) for entry of login credentials, such as an entity's login name and password. Depending on whether the entity is a manufacturer or retailer, the entity is directed to either a manufacturer report generation web page (505) or a retailer report generation web page (530).

In the instance that the entity is a manufacturer they are presented with various fields for defining a training report (510). The training report can then be generated (515) by any number of constraints such as specific retail staff member, retailer, geographic location, etc. The manufacturer can then compare this training report to sales data (520) to determine what effect the training and motivation of different retailers and locations have on its sales data. The manufacturer can next choose whether to modify the training or relationship (525) based on such comparison.

The manufacturer can also merge retail sales data with the training data by associating databases of such information, by manually inputting the information into fields of the Website to automatically correlate the information, or by visual association of retail sales data generated by entirely different means. In the instance that the data is entered into the training website or associated with the Website, the information can be protected from being accessed by other retailers or manufacturers such that a particular retailer can only see training and retail sales data for their own retail staff members and only for the manufacturer's in the system for which they sell products. Likewise, access to the information can be limited such that a manufacturer can only view information related to retailers and retail staff members that sell its products and cannot view training or retail sales data related to other manufacturer's or retailers who do not sell the manufacturers products. Likewise, access to the information can be limited such that retail staff members cannot view retail sales information nor information related to retail staff members of other retailers or for manufacturers for which they do not sell products.

Similarly, in the case that the entity is a retailer, the retailer enters a retailer reporting homepage (530) and defines the scope of the training report by entering data into various fields of the retailer report generation website (535). After a report is sent to the retailer (540), the retailer compares the report to sales data (545) to determine whether training or other changes need to be made with its retail staff member (550).

FIG. 6 depicts a chart 600 illustrating an example arrangement of retail staff member data structures in a database. As depicted in FIG. 6, each test score data element and retail staff member sales data element stored in the database can have an association with a particular retail staff member (e.g. RS1, RS2, or RS3), a particular retailer (e.g. R1, R2, or R3), and one or more manufacturers (e.g. M1, M2, or M3). It should be appreciated that the data structure cells shown in FIG. 6 representing edu-game scores (e.g., "M1 Scores") can be multiple data structures associated with different edu-games, each edu-game being associated with the same retail staff member, retailer, and manufacturer. Security mechanisms can be implemented to prevent manufacturers from accessing each others information.

For example, a set of edu-game scores from multiple edu-games may be represented in chart 600 as M1 Scores, which would be associated with a particular retail staff member (RS1), a particular retailer (R1), and a particular manufacturer (M1). Similarly, a retail staff sales data structure is represented in Chart 600 as $2,000 and can represent, for example, the amount of sales a particular retail staff member (RS1) working for a particular retailer (R1) sold of a particular manufacturer's (M1's) products. Thus, FIG. 6 illustrates one method of organizing data and associations of the data with particular entities in a database. It should be appreciated that other methods of organizing the data structures and associations within a database may be used and are included within the scope of the present invention.

Retailers can access retail sales member data (when appropriately logged in as the retailer) and can relate level of education with performance on the sales floor. Further, since manufacturers maintain sales data for the amount of product they sell into each retailer, manufacturers can compare sales figures across different retailer locations and can relate level of education with performance at each retailer.

FIG. 7 depicts a flow diagram illustrating an example method for providing a requesting entity with appropriate access to retail staff member data. As depicted in FIG. 7, login credentials are received from an entity (700). The login credentials may be received from the entity when the entity first logs into a training and testing website and is directed to a particular home page associated with the entity's status as discussed above with regard to FIG. 2.

Upon receiving the login credentials (700), the entity is identified as a particular retail staff member, retailer, or manufacturer (710). At this point associations of the entity may also be identified. For example, in the case that the entity is a manufacturer the retail staff members selling the manufacturer's products may be associated with the particular manufacturer. In addition, particular retailers employing the retail staff selling the manufacturer's products can be associated with the particular manufacturer.

Upon receiving a data access request from the entity (720), the requested data elements are accessed (730) from the database 740. The database 740 can be the administrative database referred to above with reference to FIG. 1, for example. The data elements may be accessed using any form of software and hardware that is well known in the art for storage and accessing such data. Upon receiving the requested data elements, associations of the data elements are compared to the identity of the entity (750). In the instance that the associations of the requested data elements match such that access to the data elements by the entity are appropriate, the data elements are provided to the entity (770). In the instance that the associations of the requested data elements do not match because access to the data elements by the entity are not appropriate, the entity is refused access to the data elements (760).

Appropriate access can be defined in each instance by the manufacturer, retail staff member, retailer, and an administrator. For example, retail staff members can be allowed access to their own contact information, test score data and test score results for other retail staff members working for the same retailer. Retailers can be allowed access to test score data for the retail staff members they employ, and retail staff sales data for the retail staff members they employ. A manufacturer can be allowed access to test score data and retail staff sales data for retail staff members who sell their products. However, access to test score and/or retail staff member sales data can be denied to retailers who do not employ the associated retail staff members, or to manufacturers if their products are not sold by the associated retail staff members. Thus, access to the database can be restricted based on a particular entity's status and associations.

Such a system is highly advantageous to a manufacturer. The manufacturer is able to ensure that those people who are selling their products have information regarding the products which is timely and which is minimally affected by turnover rates. Additionally, the manufacturer can draw retail staff member to its site by having entertaining games, or the edu-games discussed above, associated with the training, and by providing appropriate discounts for those who pass training/game levels.

In addition to the above, the cost of providing such a training program can often be a small fraction of television, radio, and print advertising in conjunction with traditional face to face training of retail staff members. Furthermore, the manufacturer can more readily correlate the advertising/information of the training, and more quickly determine when the advertising/information needs to be changed.

Different training modules may be created for different products or different types of products. Additionally, training modules may focus on the manufacturer or topics relating to the particular industry in which the manufacturer does business. Manufacturers have great flexibility with respect to the content of their training modules. Thus, manufacturers can include content which they think will best promote knowledge and loyalty to their product among sales people and increase advertising at the point of sale, typically via recommendations by the retail staff member. Likewise, the training message can be given to nearly all of the retail staff members selling the manufacturer's products within a short period of time. Rather than training the entire retail staff after the release of a new product in the slow traditional manner, the sales force can be trained in a matter of days and even prior to the product reaching the retailer.

Accordingly, methods and apparatuses which provide such access to information and ease of communication allow a manufacturer or retailer to manage their individual aspects of selling a manufacturer's product. Retailers are able to easily manage their retail staff members, ensuring that training is completed by the retail staff members and monitoring the performance of each retail staff member. Manufacturers are able to monitor the sales performance of retailers in comparison to the training completed by the retailer's retail staff members and assess the effectiveness of their training and sales program accordingly.

When sales pitches are based on personal use of the product and actual information about the manufacturer, the sales pitches become more believable and trusted by the consumer, and therefore more effective in encouraging sales. It is much more effective in encouraging sales for a consumer to learn about a manufacturer and its products from a retail staff member who has experience with the products than from conventional advertising before the sale or product information printed on the products themselves. By providing product incentives retail sales members are encouraged, through storylines and corresponding edu-games, to buy and use a manufacturers products. This results in practical experience with a product as well as product knowledge.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system having a display, a method for using multimedia training materials and an edu-game to train a retail sales representative about a brand and for providing results of the training, wherein the multimedia training materials include one or more manufacturer brand storylines and wherein the edu-game comprises a plurality of questions that are presented to retail sales representative along with a correct answer and one or more incorrect answers that correspond to the one or more manufacturer brand storylines and an allotted amount of time to answer each question, and wherein results of the edu-game are correlated with sales productivity of the retail sales representative, the method comprising:

at a computing system, presenting one or more multimedia presentations of manufacturer brand storylines to a retail sales representative corresponding to one or more manufacturer products that are sold by the retail sales representative, the one or more multimedia presentations being presented on a display of the computing system;

at the computing system, testing the retail sales representative about the one or more brand storylines within an edu-game, wherein the testing results in an edu-game score associated with the retail sales representative and the one or more brand storylines that the retail sales representative was tested about during the edu-game; and generating a report which displays the edu-game score along with sales production data corresponding to sales of the one or more manufacturer products sold by the retail sales representative, wherein the testing within the edu-game includes the following:

initiating and displaying a cumulative timer corresponding to a cumulative time of participation in the edu-game; and presenting one or more questions about the one or more brand storylines and for each question, performing the following steps:

displaying the question and a plurality of corresponding possible answers to the question;

initiating a countdown timer to a specified time such that the countdown timer expires after the specified time has elapsed, the countdown timer indicating how long the question is to be displayed;

displaying the time remaining on the countdown timer;

receiving from the retail sales representative a selection of one of the possible answers;

adding an amount of time to the cumulative time based on the received selection, wherein the amount of time added to the cumulative time is dependent on whether the received selection is correct or incorrect, which adding comprises:

when selection of an answer is received, determining whether the received selection is the correct answer;

when the received selection is determined to be the correct answer, adding to the cumulative time the amount of time that has elapsed from a specified time initially provided at the countdown timer, when the received selection is determined to be an incorrect answer, adding to the cumulative time the specified time initially provided at the countdown timer irrespective of the amount of time that has elapsed from the specified time initially provided at the countdown timer at the time the selection is received; and when no selection is received before the specified time initially displayed at the countdown timer expires, adding to the cumulative time the full specified time initially provided at the countdown, and such that the cumulative time corresponds to the score;

displaying the cumulative time along with an indication of the received selection subsequent to receiving the selection; and obtaining the score of the retail sales representative in the edu-game based on at least the cumulative time.

2. The method of claim 1, further comprising:
determining whether the edu-game was passed based on a number of questions answered correctly.

3. The method of claim 1, further comprising:
determining whether an incentive was earned based on the cumulative time.

4. The method of claim 3, wherein the incentive is a discount on a purchase of goods sold by the manufacturer.

5. The method of claim 4, wherein the amount of the discount is determined based on the cumulative time.

6. The method recited in claim 5, wherein the discount is an adjustable amount comprising a percentage selected from a plurality of different percentage discounts corresponding to a plurality of different cumulative scores.

7. The method of claim 4, further comprising:
displaying a link to the one or more manufacturer products for the purchase of products using the discount.

8. The method of claim 1, wherein the plurality of possible answers includes one right answer and at least one wrong answer, wherein the at least one wrong answer is randomly selected from a set of possible wrong answers, wherein the set of possible wrong answers is larger than the number of wrong answers displayed.

9. The method of claim 1, wherein the plurality of possible answers to a first question of the edu-game are displayed on the display in a different screen presentation layout then the plurality of possible answers to a second question of the edu-game.

10. The method of claim 1, wherein the potential questions displayed are randomly selected from a set of possible questions, wherein the set of possible questions is larger than the number of questions displayed in the edu-game.

11. The method of claim 1, wherein the one or more brand storylines is presented in a plurality of sequential chapters.

12. The method of claim 1, wherein the one or more brand storylines includes music and pictures.

13. The method of claim 1, wherein the one or more brand storylines describes at least one of a history of the first manufacturer, a technology behind the first manufacturer's products, and a new product sold by the first manufacturer.

14. The method of claim 1, wherein each countdown timer is displayed as a graphical representation of the time remaining.

15. The method of claim 1, further comprising presenting the edu-game to a second retail sales representative.

16. The method of claim 15, wherein the second retail sales representative works for a different retailer than the first retail sales representative.

17. The method of claim 16, wherein each question presented to both the first and the second retail sales representative test knowledge learned from a previously presented storyline that described at least one of a history of a first manufacturer, a technology behind the first manufacturer's products, and a new product sold by the first manufacturer.

18. The method of claim 16, further comprising:
presenting the edu-game to a plurality of retail sales representatives that work for a same retailer;
presenting the edu-game to a plurality of retail sales representatives that work for a second retailer; and ranking the retail sales representatives of each retailer based on their performance on the edu-game, and providing the ranking to each retail sales representative.

19. The method of claim 1, further comprising:
storing the score in a database as a data element associated with the first retail sales representative, a retailer employing the first retail sales representative, and a manufacturer of the one or more manufacturer products sold by the first retail sales representative.

20. The method recited in claim 1, wherein the report is provided to a manufacturer associated with the one or more manufacturer products, and to thereby enable the manufacture to determine an effectiveness of training provided through the one or more multimedia presentations and testing with the edu-game.

21. The method recited in claim 1, wherein the report reflects a direct correlation between the one or more manufacturer products sold by the sales representative and the score of the edu-game.

22. The method recited in claim 1, wherein the one or more multimedia presentations each correspond to predetermined levels that are to be completed in a specific order, wherein the retail sales representative is not able to access a multimedia presentation that corresponds to a level without first accessing any multimedia presentations that correspond to prior levels in the specific order.

23. The method recited in claim 22, further comprising:
determining whether an incentive was earned based on the cumulative time, wherein the incentive is scaled to the levels of the multimedia presentations so that that the incentive cumulatively increases each time a multimedia presentation corresponding to a higher level in the specified order is accessed.

24. A computer program product for use in a computing system having a display, for implementing a method for using multimedia training materials and an edu-game to train a retail sales representative about a brand and for providing results of the training, wherein the multimedia training materials include one or more manufacturer brand storylines and wherein the edu-game comprises a plurality of questions that are presented to retail sales representative along with a correct answer and one or more incorrect answers that correspond to the one or more manufacturer brand storylines and an allotted amount of time to answer each question, and wherein results of the edu-game are correlated with sales productivity of the retail sales representative, the computer program product comprising:
one or more computer-readable storage media storing computer-executable instructions which, when executed by a computing system, implement the method and wherein the method includes:
at the computing system, presenting one or more multimedia presentations of manufacturer brand storylines to a retail sales representative corresponding to one or more manufacturer products that are sold by the retail sales representative, the one or more multimedia presentations being presented on a display of the computing system;
at the computing system, testing the retail sales representative about the one or more brand storylines within an edu-game, wherein the testing results in an edu-game score associated with the retail sales representative and the one or more brand storylines that the retail sales representative was tested about during the edu-game; and
generating a report which displays the edu-game score along with sales production data corresponding to sales of the one or more manufacturer products sold by the retail sales representative,
wherein the testing within the edu-game includes the following:
initiating and displaying a cumulative timer corresponding to a cumulative time of participation in the edu-game; and
presenting one or more questions about the one or more brand storylines and for each question, performing the following steps:
displaying the question and a plurality of corresponding possible answers to the question;
initiating a countdown timer to a specified time such that the countdown timer expires after the specified time has elapsed, the countdown timer indicating how long the question is to be displayed;
displaying the time remaining on the countdown timer;
receiving from the retail sales representative a selection of one of the possible answers;
adding an amount of time to the cumulative time based on the received selection, wherein the amount of time added to the cumulative time is dependent on whether the received selection is correct or incorrect, which adding comprises:
when selection of an answer is received, determining whether the received selection is the correct answer;
when the received selection is determined to be the correct answer, adding to the cumulative time the amount of time that has elapsed from a specified time initially provided at the countdown timer,
when the received selection is determined to be an incorrect answer, adding to the cumulative time the specified time initially provided at the countdown timer irrespective of the amount of time that has elapsed from the specified time initially provided at the countdown timer at the time the selection is received; and
when no selection is received before the specified time initially displayed at the countdown timer expires, adding to the cumulative time the full specified time initially provided at the countdown, and such that the cumulative time corresponds to the score;
displaying the cumulative time along with an indication of the received selection subsequent to receiving the selection; and
obtaining the score of the retail sales representative in the edu-game based on at least the cumulative time.

25. The computer program product of claim 24, further comprising computer-executable instructions that, when executed by a processor, cause the computer system to perform the following:
determine whether the first edu-game was passed based on the number of questions answered correctly; and
determine whether an incentive was earned based on the cumulative time.

26. The computer program product of claim 24, wherein the questions test the first testing recipient's knowledge of a previously presented storyline, the storyline describing at least one of a history of a manufacturer, a technology behind the manufacturer's products, and new products sold by the manufacturer.

27. The computer program product of claim 24, further comprising computer-executable instructions that, when executed by a processor, cause the computer system to perform the following:

receive retail sales data for a retail staff member; and
store the cumulative time data and the retail sales data for the retail staff member in a database.

* * * * *